H. N. HARPER.
CULTIVATOR AND COTTON CHOPPER.
APPLICATION FILED JUNE 3, 1908.
915,432.
Patented Mar. 16, 1909.
3 SHEETS—SHEET 2.
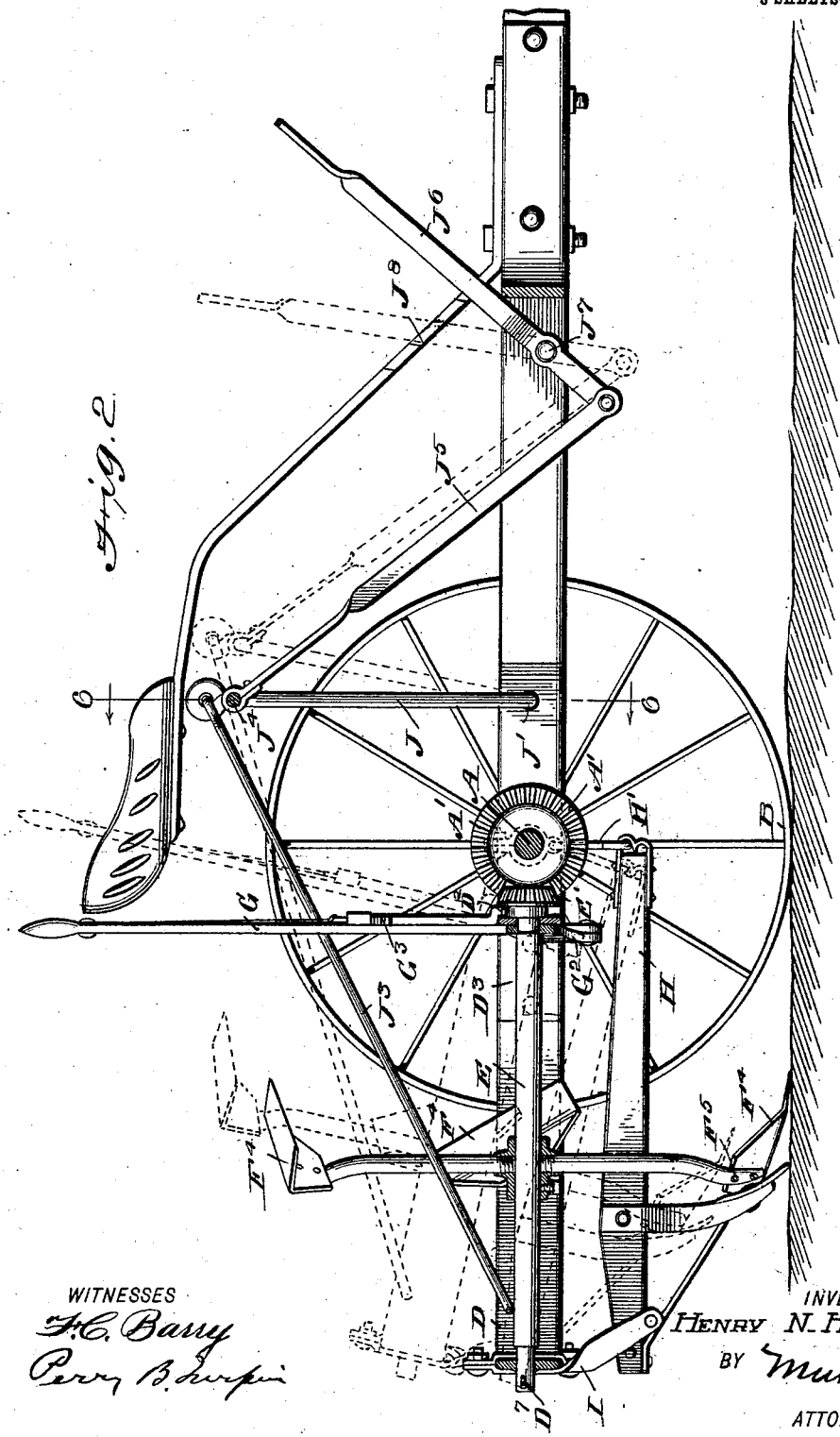
WITNESSES
INVENTOR
HENRY N. HARPER
BY
ATTORNEYS H. N. HARPER.
CULTIVATOR AND COTTON CHOPPER.
APPLICATION FILED JUNE 3, 1908.
915,432.
Patented Mar. 16, 1909.
3 SHEETS—SHEET 3.
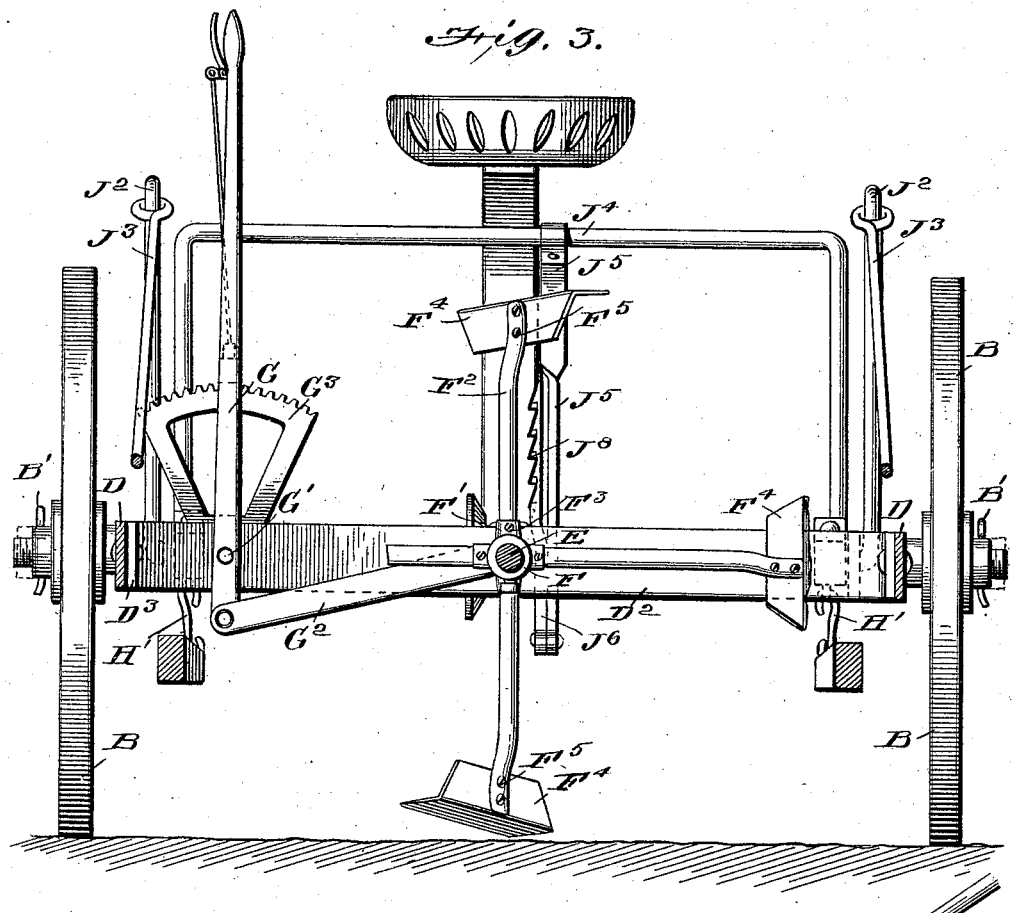
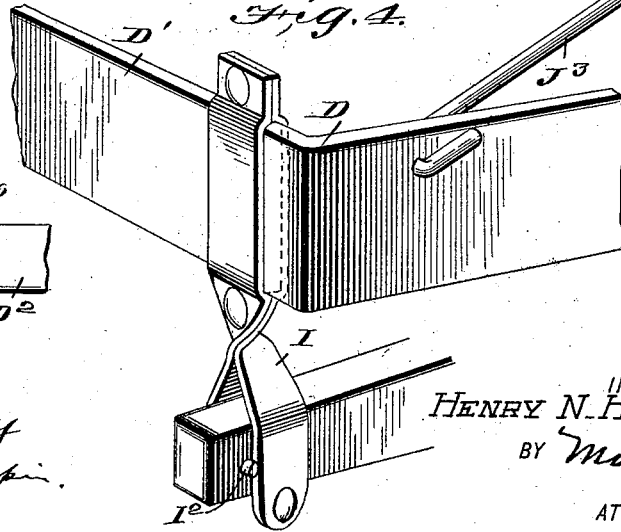
WITNESSES
INVENTOR
HENRY N. HARPER
BY
ATTORNEYS.

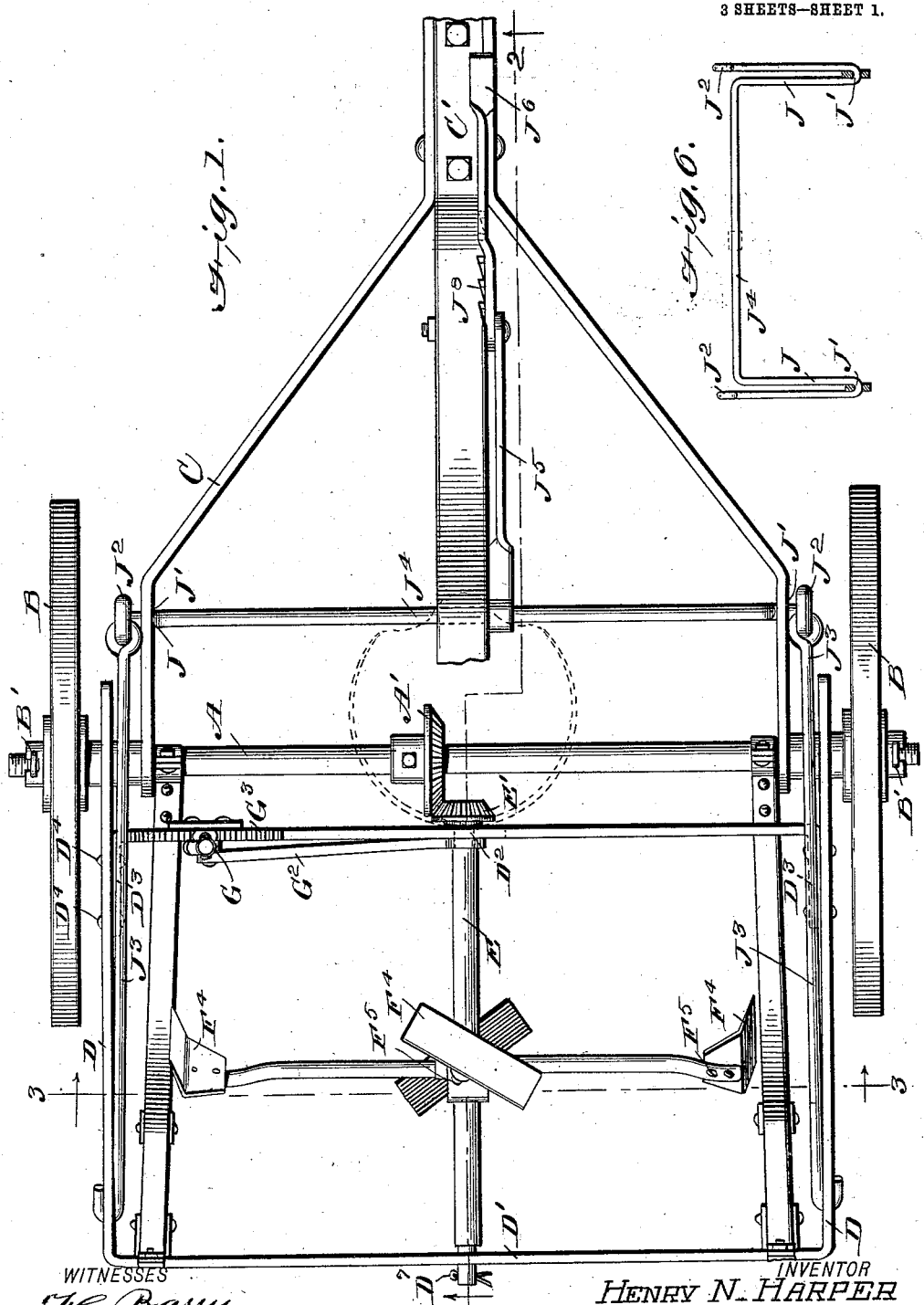

UNITED STATES PATENT OFFICE.

HENRY N. HARPER, OF MONROE, LOUISIANA.

CULTIVATOR AND COTTON-CHOPPER.

No. 915,432.      Specification of Letters Patent.      Patented March 16, 1909.

Application filed June 3, 1908. Serial No. 436,376.

*To all whom it may concern:*

Be it known that I, HENRY N. HARPER, a citizen of the United States, and a resident of Monroe, in the parish of Ouachita and State of Louisiana, have made certain new and useful Improvements in Cultivators and Cotton-Choppers, of which the following is a specification.

This invention is an improvement in cotton choppers and consists in certain novel constructions and combinations of parts as will be hereinafter described and claimed.

In the drawings, Figure 1 is a top plan view, partly broken away, of a machine embodying my invention. Fig. 2 is a vertical longitudinal section thereof on about line 2—2 of Fig. 1. Fig. 3 is a cross section on about line 3—3 of Fig. 1. Fig. 4 is a detail perspective view of one of the rear corners of the carrier frame showing the plow stock and the hanger therefor. Fig. 5 is a detail view illustrating the slotted bearing for the front end of the hoe shaft, and Fig. 6 is a detail sectional view, on a reduced scale, on about line 6—6 of Fig. 2.

In carrying out the invention I provide a main shaft $A$, in the form of an axle, on the ends of which are mounted the wheels $B$. These wheels may be secured to the shaft $A$ by linch pins $B'$ when the machine is used as a cotton chopper, and when used as a cultivator as more fully described hereinafter, the linch pins may be removed and nuts supplied on the ends of the shaft as indicated in dotted lines Fig. 3, to permit the wheels to turn on the axle in the use of the machine as a cultivator.

The axle journals in the rear end of the main frame $C$, to which the draft tongue $C'$ is secured, and a carrier frame $D$ is pivoted at its front end upon the axle $A$, so the said carrier frame can be raised and lowered at its rear end. This carrier frame has a rear cross bar $D'$, and a front cross bar $D^2$. The bar $D^2$ is removably secured to the side bars of the carrier frame, being for such purposes provided at its ends with the right angular portions $D^3$ lapping along the inner sides of the side bars and secured thereto by bolts $D^4$ so the bar $D^2$ may be removed whenever desired for any purpose. This bar $D^2$ has a slotted opening $D^6$ which forms a bearing for the front end of the hoe shaft $E$ and is elongated laterally in the direction of length of the bar $D^2$ so the hoe shaft $E$ may be moved laterally at its front end to set its beveled gear $E'$ into and out of mesh with the beveled gear $A'$ on the shaft $A$, the said gears $E'$ and $A'$ being preferably secured to their shafts by set screws so they can be removed and adjusted as may be desired. At its rear end the shaft $E$ journals in the rear bar $D'$ of the carrier frame $D$, and a pin $D^7$ is passed through the shaft $E$ in rear of the said bar which pin can be removed, when by unbolting the bar $D^2$, the said bar $D^2$ and the chopper shaft can be removed bodily from the machine to adapt the latter for use as a cultivator frame.

The hoeing devices are carried by the shaft $E$ and comprise preferably, a hub or body $F$, having sockets $F'$ in which the inner ends of the hoe bars $F^2$ are held by set screws $F^3$ so the said hoe bars may be adjusted to any desired position in the sockets or removed and replaced if desired. The hoes $F^4$ are secured on the outer end of the bars $F^2$, preferably adjustably, and bolts or screws $F^5$ secure them in position so they may be removed and replaced. By this means the width of the cut of the hoe may be varied as desired.

For adjusting the beveled gear $E'$ into and out of mesh with the gear $A'$, I provide a lever $G$ pivoted at $G'$ to the frame bar $D^2$ and connected at its lower end by the link $G^2$ with the chopper shaft so it may be operated to move the said shaft laterally in such manner as to set the gear $E'$ into and out of mesh with the gear $A'$. By this means the chopper device can be thrown in a moment into and out of operative connection with the drive mechanism, and a rack $G^3$ is arranged for engagement by a pawl carried by the lever $G$ whereby to hold the lever in any desired position to secure the gears $E'$ and $A'$ in or out of mesh. This lever $G$ and the rack $G^3$ it will be noticed are carried by a removable bar $D^2$ so that they are always in position relative to the chopper shaft $E$ and are removed from the machine and replaced with the said bar $D^2$ in the use of the machine as before described.

When desired plows may be used in connection with the chopper devices so they may be used when the chopper devices are removed from the machines. Ordinary plow beams $H$, known as "Georgia stocks" may be employed, and these stocks are hung at their front ends from the axle $A$ by hangers $H'$ connected at their lower ends with the plow clevis and clamped at their upper ends upon the axle $A$ as indicated in dotted lines Fig. 2, and at their rear ends the plow beams are suspended from the cross bar D by hangers I, clamped at their upper ends to the said bar D' and having at their lower ends box-like portions which embrace the rear end of the plow beam and are secured thereto by a clamping bolt, a pin I² being passed through the beam adjacent to the hanger I, as shown in Figs. 2 and 4 of the drawing. The rear ends of the plow beam are thus connected with the carrier frame so that the rocking of the said frame on the axle A will regulate the depth of the plow, and will also permit the lifting of the plows clear of the ground when desired. This rocking of the carrier frame on the axle also enables me to regulate the depth of the hoes F⁴ as well as to lift the said hoes clear of the ground whenever desired as in moving from field to field in the use of the invention.

For raising and lowering the carrier frame I provide an intermediate lever frame J pivoted at its opposite ends at J' in the side bars of the main frame, and provided at said ends with upwardly projecting arms J² whose upper ends are connected by rods J³ with the carrier frame, preferably near the rear end of the latter, and the said lever frame has an intermediate arm J⁴ in the form of an arch to whose central portion is secured the upper rear end of a link J⁵, whose front end is secured to the lower end of an operating lever J⁶ pivoted at J⁷ to the pole and engaging with a rack J⁸ by which it may be secured in different adjustments to hold the carrier frame in any desired position. The operation of the lever J⁶ is well illustrated in full and dotted lines Fig. 2, the full lines showing the carrier frame lowered to position for use, and the dotted lines showing the said frame raised to adjust the holes clear of the ground. The lever J⁶, it will be noticed is arranged in position to be operated from the driver's seat, this being best shown in Fig. 2 of the drawings.

The hoes F⁴ as described are removable and they may be replaced by hoes of different widths, thus aiding in regulating the width of the stand of cotton left in the row.

I claim—

1. The improvement in cotton choppers herein described comprising a main frame, an axle journaled to the main frame, a carrier frame pivoted at its front end on the axle whereby it may be raised and lowered, and having a rear cross bar, a front cross bar provided with a laterally slotted opening for a hoe shaft, means for securing the front cross bar detachably in place, a rack mounted on the said cross bar, a hoe shaft journaled at its front end in the slotted opening of the front cross bar, and also having a bearing at its rear end in the rear bar of the carrier frame, gearing between the front end of the hoe shaft and the axle, a lever pivoted to the front cross bar and having a pawl engaging with the rack mounted on said bar, a link connecting the said lever with the front end of the hoe shaft, an intermediate lever frame pivoted at its ends to the main frame and provided at its ends with upwardly projecting arms, and also having an intermediate arm in the form of an arch, an operating lever connected with said intermediate arm, and rods connecting the end arms of the intermediate lever with the rear portion of the carrier frame whereby the operating lever may be manipulated to raise and lower the rear end of the carrier frame, substantially as set forth.

2. A cotton chopper comprising an axle, a main frame in advance thereof, a carrier frame in rear of the axle and pivoted at its front end thereto, hoeing devices in the carrier frame and geared with the axle, an intermediate lever frame pivoted to the main frame and having upwardly projecting arms, and rods connecting the same with the carrier frame, and a lever for operating the intermediate frame substantially as set forth.

3. In a machine substantially as described, the combination with a drive shaft, and a carrier frame having a main bar, and a front bar, the latter being provided with a laterally slotted bearing, a hoe shaft journaled at its front end in the said slotted bearing and geared at such end with the drive shaft, and a lever connecting with the front end of the hoe shaft whereby to shift the same in its slotted bearing to move the chopper shaft into and out of gear with the drive shaft, and chopping devices on the chopper shaft, substantially as set forth.

4. A machine substantially as described, comprising an axle, a main frame in advance of the axle, a carrier frame in rear of the axle and pivoted at its front end thereto, chopping devices in the carrier frame geared with the axle, an intermediate lever frame pivoted at its ends in the main frame, and having at said ends upwardly projecting side arms, and also provided with an upwardly projecting arch-like portion between said side arms, rods connecting the side arms with the carrier frame, and an operating lever connected with the arch portion of the intermediate lever frame, substantially as set forth.

HENRY N. HARPER.

Witnesses:
ROBERT O. RANDLE,
C. S. DUNN.